United States Patent [19]

Chung

[11] Patent Number: 5,434,877
[45] Date of Patent: Jul. 18, 1995

[54] SYNCHRONIZED ETALON FILTERS

[75] Inventor: Yun C. Chung, Aberdeen, N.J.

[73] Assignee: AT&T Corp., Murray Hill, N.J.

[21] Appl. No.: 187,438

[22] Filed: Jan. 27, 1994

[51] Int. Cl.$^6$ ............................................. H01S 3/13
[52] U.S. Cl. ...................................... 372/32; 372/18; 372/19; 372/92
[58] Field of Search ................................. 372/29–32, 372/92, 98, 9; 359/346, 352

[56] References Cited

U.S. PATENT DOCUMENTS

| | | | |
|---|---|---|---|
| 4,932,030 | 6/1990 | Chung | 372/32 |
| 5,081,635 | 1/1992 | Wakabayashi et al. | 372/32 |
| 5,084,884 | 1/1992 | Terada | 372/98 |
| 5,130,998 | 7/1992 | Wakata et al. | 372/32 |
| 5,134,624 | 7/1992 | Ono | 372/32 |
| 5,151,585 | 9/1992 | Siebert | 356/352 |
| 5,214,659 | 5/1993 | Terada et al. | 372/98 |

OTHER PUBLICATIONS

"Optical FDM Transmission Technique", K. Nosu et al., Journal Lightwave Tech., vol. LT-5, pp. 1301–1308, Sep. 1987.
"WDM Coherent Star Network With Absolute Reference", Y. C. Chung et al., Electron. Lett. vol. 24, No. 21, pp. 1313–1314, 1988.
"Densely Spaced FDM Coherent Optical Star Network With Optical Signals Continued To Equally Spaced Frequencies", B. S. Glance et al., Journal Lightwave Technologies, vol. 6, pp. 1770–1781, Nov. 1988.
"Frequency-Locked 1.3 Micron and 1.5 Micron Semiconductor Lasers for Lightwave Systems Applications", Y. C. Chung, Journal Lightwave Technologies, vol. 8, pp. 869–876, Jun. 1990.
"Athermal Glass For the Infrared", S. Mitachi et al., Applied Opt., vol. 30, No. 10, pp. 1285–1289, 1991.
"A. 1.5 Micron Laser Package Frequency-Locked With a Novel Miniature Discharge Lamp", Y. C. Chung et al., IEEE Photon. Technol. Lett., vol. 3, pp. 841–844, Sep. 1991.
"Frequency Stabilization of Laser Diode Using a Frequency-Locked Ring Resonator to Acetylene As Absorption Lines", Sakai et al., IEEE Photon. Technol. Lett., vol. 3, pp. 868–870, Oct. 1991.
"Calibrated Fabry-Periot Etalon As An Absolute Frequency Reference for OFDM Communications", R. Boucher et al., IEEE Photonics Technol. Lett., vol. 4, pp. 801–804, Jul. 1992.

Primary Examiner—Léon Scott, Jr.
Attorney, Agent, or Firm—Stuart H. Mayer

[57] ABSTRACT

A method for synchronizing an etalon to a preselected set of optical frequencies includes the step of generating a transmission spectrum for an etalon having a characteristic free spectral range that is a function of its effective length. The optical frequencies for the transmission spectrum are provided by two optical reference frequencies such as produced by a first and second frequency locked laser. The effective length of the etalon is set in relation to the optical reference frequencies.

23 Claims, 5 Drawing Sheets (a)

SYNCHRONIZED ETALON FILTERS

BACKGROUND

The use of amplified wavelength-division-multiplexed (WDM) communication systems can substantially increase the transmission capacity of existing single-mode fiber systems. However, WDM systems require strict spectral control of the transmitter lasers in order to maintain constant channel spacing and avoid crosstalk. Thus, at a minimum, each laser should operate at one specific wavelength for the entire lifetime of the system. If this were the only criterion, every WDM system (which may be part of a large scale WDM network) could operate at a different set of wavelengths. Since in this case each laser would operate at one particular preselected wavelength that may be different from all the other lasers, it would be necessary to accurately track and record the operating wavelength of every transmitter laser in the network. Moreover, due to the lack of standardization, a large stock of replacement lasers would be required since no single replacement could substitute for all the lasers employed in the system. These deficiencies could be eliminated if all the WDM transmitter lasers operated at the same predetermined set of wavelengths. In addition, such standardization could increase the multivendor compatibility of WDM transmission equipment.

Known techniques for maintaining a constant channel spacing in a WDM system include those disclosed in B. S. Glance et al., "Densely Spaced FDM Coherent Optical Star Network With Optical Signals Confined To Equally Spaced Frequencies," J. Lightwave Technol., vol. 6, pp. 1770–1781, Nov. 1988, and K. Nosu et al., "Optical FDM Transmission Technique," J. Lightwave Technol., vol. LT-5, pp. 1301–1308, Sept. 1987. In these systems the transmitter lasers are locked to an optical resonator. Absolute frequency references such as lasers frequency-locked to an atomic or molecular absorption line have been added to these resonators to ensure long-term stability (see Y. C. Chung et al., "WDM Coherent Star Network With Absolute Reference," Electron. Lett., vol. 24, no. 21, pp. 1313–1314, 1988, and Sakai et al., "Frequency Stabilization of Laser Diode Using a Frequency-Locked Ring Resonator to Acetylene As Absorption Lines," IEEE Photon. Technol. Lett., vol. 3, pp. 868–870, Oct. 1991.) These known techniques provide lasers that transmit a comb or set of equally spaced absolute reference frequencies. However, because each transmitter laser set employ a different resonator that cannot be guaranteed to produce an identical set of resonant frequencies, the channel spacing will differ slightly from one WDM system to another and hence each WDM system will operate at a different comb of frequencies.

Another known technique for maintaining a constant channel spacing is disclosed in R. Boucher et al., "Calibrated Fabry-Perot Etalon as an Absolute Frequency Reference for OFDM Communications," IEEE Photonics Technol. Lett., vol. 4, pp. 801–804, July 1992. This reference employs piezoelectrically tuned Fabry-Perot interferometers calibrated in the 1.3 micron spectral region. By adjusting the cavity lengths identical sets of resonant frequencies can be provided. The interferometers are then locked to an absolute reference to maintain the calibrated cavity lengths. However, the interferometers adjusted by this procedure cannot maintain their calibration without continuous feedback so that they remain locked to the absolute reference.

Accordingly, there is no known simple and reliable technique for synchronizing etalons so that different etalons can provide identical sets of equally spaced frequencies.

SUMMARY

In accordance with one example of this invention, an etalon has been developed which is synchronized to a preselected set of resonant frequencies by varying the effective length of the etalon cavity.

In accordance with another example of this invention, a method has been developed for synchronizing an etalon to a preselected set of optical frequencies. In this example, the method includes the step of generating a transmission spectrum for an etalon having a characteristic free spectral range that is a function of its effective length. The effective length of the etalon is then set in relation to first and second optical reference frequencies such as may be provided by frequency locked lasers.

Once synchronized, the etalons produced in accordance with this invention may be used as absolute frequency references without the need for frequency-locked lasers. These etalons may be employed at remote locations for standardizing WDM transmitter laser wavelengths. Thus, according to another example of the invention, a wavelength-division-multiplexed optical communication system has been developed that includes at least two optical transmitters each having a laser operating at a preselected, standardized optical frequency chosen from among a set of predefined optical frequencies. The system also includes a multiplexer for multiplexing at least two optical signals each having a frequency equal to one of the predefined optical frequencies.

There are only a few examples of the invention. The full scope of the invention entitled to an exclusionary right is set forth in the claims at the end of this application.

DETAILED DESCRIPTION

Solid etalons are advantageously employed to frequency lock lasers because of their simplicity and mechanical stability. However, it is not possible in practice to manufacture physically identical etalons and thus no two etalons can be guaranteed to produce identical sets of resonant frequencies. This invention compensates for minor physical differences among various etalons so that they can all be synchronized to produce identical sets of resonant frequencies.

It is well-known that the resonant frequency of the mth mode of an etalon is given by $$v_m = mL = \frac{mC}{2nl\cos\theta} \quad (1)$$

where m is the mode number, L is the free-spectral-range (FSR), C is the speed of light, n is the refractive index, l is the cavity length of the etalon, and $\theta$ is the angle of incidence of the optical beam upon the etalon. Physical differences among etalons manifest themselves as differences in the cavity length l and/or refractive index n. As equation 1 suggests, the effective length l cos $\theta$ can be varied to compensate for these physical differences so that each etalon yields the same set of resonant frequencies $v_m$. While the effective length of the etalon can be varied by varying either the length l, the incident angle $\theta$, or the refractive index n, the following discussion will assume that the effective length is varied by varying the angle $\theta$. Of course, one skilled in the art will recognize that the length l or the refractive index n could be varied instead.

To adjust the incident angle $\theta$ so that the etalon is synchronized to a preselected set of optical frequencies two absolute frequency references are required since both the mode number m and the free spectral range L in equation 1 are unknown. For example, the incident angle $\theta$ can be adjusted to match the etalon's resonant frequencies $v_{m-k}$ and $v_n$ to the absolute references at $v_1$, and $v_2$, respectively. Thus, every etalon can be synchronized by establishing (k+1) channels between the two absolute references. However, it may not be possible to fully satisfy these two matching conditions simultaneously since the mode number m must be an integer. Thus, the incident angle $\theta$ should be adjusted so that one of the etalon's resonant frequencies is synchronized to one of the absolute references while minimizing the offset between the other absolute reference and the other resonant frequency of the etalon. This offset will be very small if the number of channels is large. Thus, this method can determine the specific mode number m (and consequently the FSR) of each etalon for a given absolute reference.

Figure 1:
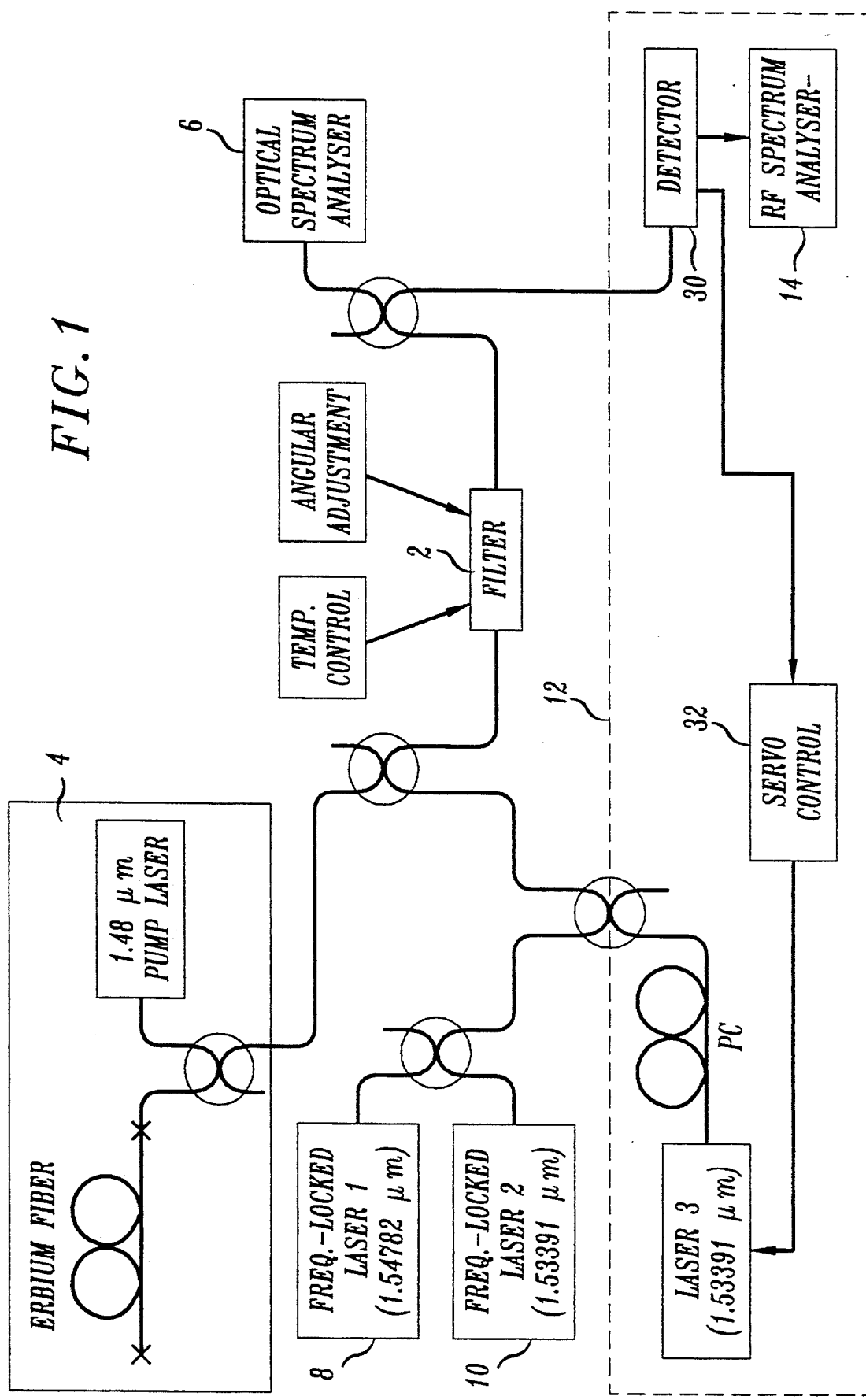
FIG. 1 shows a block diagram of an arrangement for synchronizing an etalon in accordance with this invention.

FIG. 1 shows a simplified block diagram of the arrangement employed by this invention for synchronizing an etalon 2. The resonant frequencies of the etalon can be monitored directly using a broadband optical source 4 (such as an erbium-doped fiber amplifier or an LED) and an optical spectrum analyzer 6. The etalon 2 is calibrated with two absolute frequency references 8 and 10. The frequency references 8 and 10 may be provided by any method known in the art. In one example of the invention, the absolute references are provided by frequency locked lasers in which the frequency locking is achieved by using the optogalvanic effect, such as disclosed in Y. C. Chung et al., "A 1.5-Micron Laser Package Frequency-Locked With a Novel Miniature Discharge Lamp," IEEE Photon. Technol. Lett., vol. 3, pp. 841–844, Sept. 1991; Y. C. Chung, "Frequency-Locked 1.3 Micron and 1.5 Micron Semiconductor Lasers for Lightwave Systems Applications," J. Lightwave Technol., vol. 8, pp. 869–876, June 1990; and U.S. Pat. No. 4,932,030. One laser may be advantageously locked, for example, to the Kr $1s_2 - 2p_8$ transition at 1.54782 microns (193.821 THz) and the other laser may be locked to the Kr $2p_{10} - 3d_3$ transition at 1.53391 microns (195.579 THz). One reason why it is advantageous to use these two transitions as absolute references and to establish 18 channels between them is because the resulting channel spacing (about 103.4 GHz) is very close to the free-spectral-range (FSR) of 1-mm thick fused silica etalons.

If the frequency references 8 and 10 are supplied by lasers frequency locked to an atomic or molecular transition as discussed above, the resulting channel spacing provided by the synchronized filters may not have whole number values because a natural, random frequency standard is employed. In those situations where it is advantageous to have channel spacings that are whole numbers apart, one of the frequency references 8 and 10 may be provided by a tunable laser (e.g., commercially available grating-based lasers) locked to any arbitrary frequency using a wavemeter instead of a laser frequency locked to atomic or molecular lines. Such an arrangement can provide an absolute frequency reference at any wavelength that is desired. Accordingly, this arrangement maximizes the range of channel spacing that can be provided by the etalons of this invention.

For purposes of illustration only the following discussion will assume that an etalon is to be synchronized to the above-mentioned Kr transitions at 1.54782 microns and 1.53391 microns and that 18 channels are to be established between them. Of course, the invention is not limited to any particular number of channels nor any particular pair of absolute frequency references.

To establish 18 channels between the frequency references the incident angle should be adjusted so that the (m)th mode and (m−17)th mode of the etalon are matched to the absolute references at 1.53391 and 1.54782 microns, respectively. From equation 1, this requirement is met when the mode number m and the FSR of the etalon are 1891 and 103.43 GHz, respectively. These values of the mode number and FSR are obtained when the incident angle is adjusted to maximize the amplitudes of the frequency-locked laser beams transmitted through the etalon 2 while monitoring 18 resonant peaks between them with the optical spectrum analyzer 6.

A series of etalons were fabricated to demonstrate the synchronization method of this invention. Of course, the etalons employed in this invention may be configured in any desired manner and thus the following particular arrangement is presented for illustrative purposes only. The etalons were fabricated from fused silica glass having end faces coated with seven layers of $TiO_2/SiO_2$ to form a cavity therebetween. The mirror reflectivity was estimated to be about 90%. The finesses of these etalons were measured to be about 30 at the normal incident angle. The fused silica glasses which had an index homogeneity of about $10^{-6}$, were obtained from several different vendors with a thickness specification of 1 mm±10 microns. To minimize the thermal drift of the resonant frequencies, the etalons were mounted on a thermoelectric cooler, which in turn was connected to a copper heat sink. The heat sink was configured to be rotatable to vary the incident angle by using a precision rotation stage located external to the etalon package. The thermoelectric cooler and the copper heat sink were provided with appropriately dimensioned holes to allow the laser beam to pass through. It was determined that the thermal drift of this etalon arrangement was negligible when the temperature of the etalon was set to 20±0.01° C. If the etalons are constructed from athermal glasses such as disclosed in S. Mitachi and P. A. Tick, "Athermal Glass for the Infrared," Appl Opt., vol 30, No. 10, pp. 1285–1289, 1991, the need for a temperature control loop as employed herein would be eliminated. The insertion losses of these etalons were typically less than 2 dB, including fiber coupling losses. Once the incident angle is adjusted in accordance with the method of this invention to produce the desired set of resonant frequencies, the incident angle may be permanently fixed by soldering the copper heat sink to a portion of the etalon package.

Figure 2A:
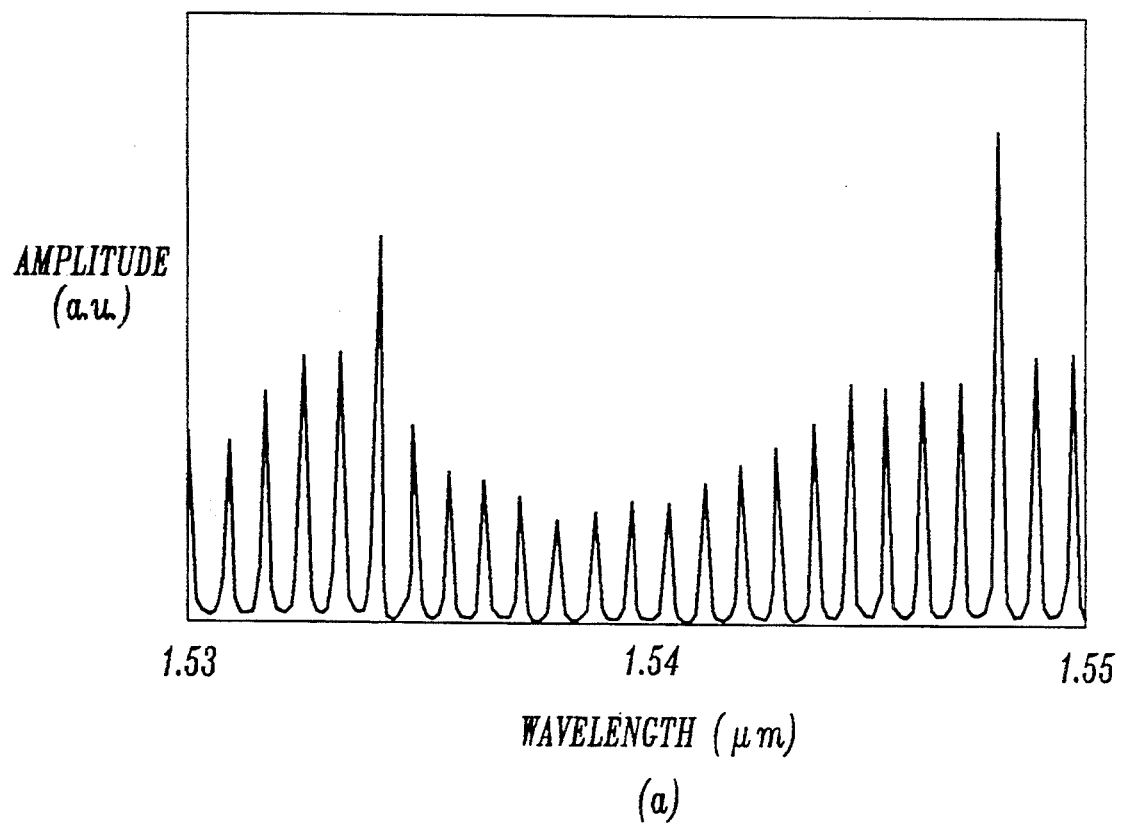
FIG. 2(a) shows the optical transmission spectrum of an etalon which has two modes synchronized to two absolute frequency references.

FIG. 2(a) shows the optical transmission spectrum produced by one of the above-described etalons when the incident angle was adjusted with the arrangement shown in FIG. 1 so that the (m)th mode and (m−17)th mode of the etalon were synchronized to the absolute references at 1.53391 and 1.54782 microns, respectively. The two highest peaks seen in FIG. 2(a) represent the absolute reference frequencies produced by the frequency-locked lasers 8 and 10. However, it should be noted that the amplitude of the laser 8 was slightly reduced from its peak value when the amplitude of the laser 10 was maximized, indicating that the (m)th mode was precisely matched to the absolute reference at 1.53391 microns. This asymmetry is due to the offset between the (m−17)th mode and the absolute reference at 1.54782 microns caused by the discrete nature of the mode number. This offset varies by about 1 GHz per mode number. Thus, although the etalons employed in this illustrative example of the invention have relatively low finesse (less than about 30), the change in the amplitude of the laser 8 could be easily noticed even when the mode number changed by only one.

Figure 2B:
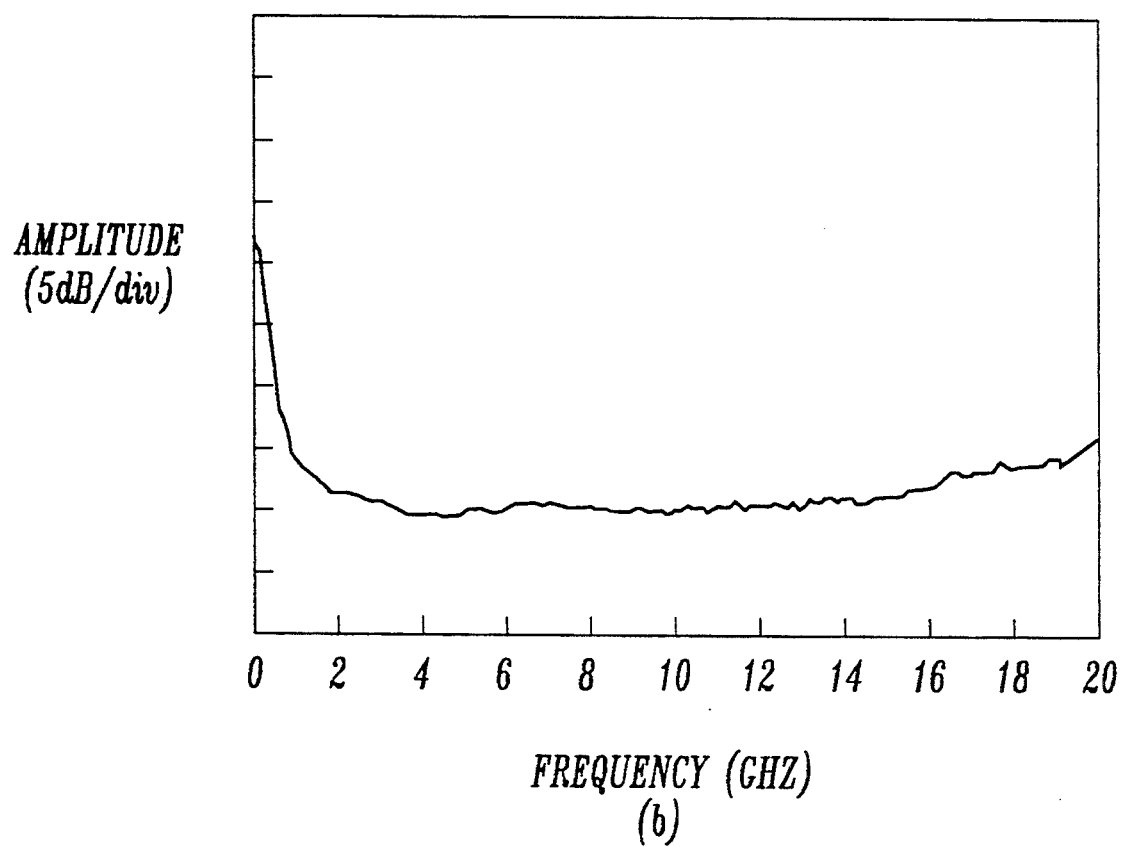
FIG. 2(b) shows the beat spectrum between a laser locked to one mode of the etalon and one of the two absolute references seen in FIG. 2(a).

When a series of etalons are calibrated based only on the two absolute references as discussed above, the resonant frequencies they produce could vary slightly among them due to the resolution of the optical spectrum analyzer 6 and the finesse of the etalon 2. For the particular set of frequencies discussed above, this variation could be as large as 6 GHz. To reduce this variation, an additional laser 12 may be employed which is locked to the (m)th mode of the etalon 2. The laser 12 may be locked to this mode in any known manner such as by employing, for example, a detector 30 and servocontrol 32. The incident angle is then further adjusted by monitoring both the optical transmission spectrum of the etalon 2 and the beat spectrum between the laser 12 and the frequency-locked laser 10. An RF spectrum analyzer 14 such as shown in FIG. 1 may be used to monitor the beat spectrum. As shown in FIG. 2(b), the incident angle is adjusted so that the beat frequency is zero Hz.

Figure 3:
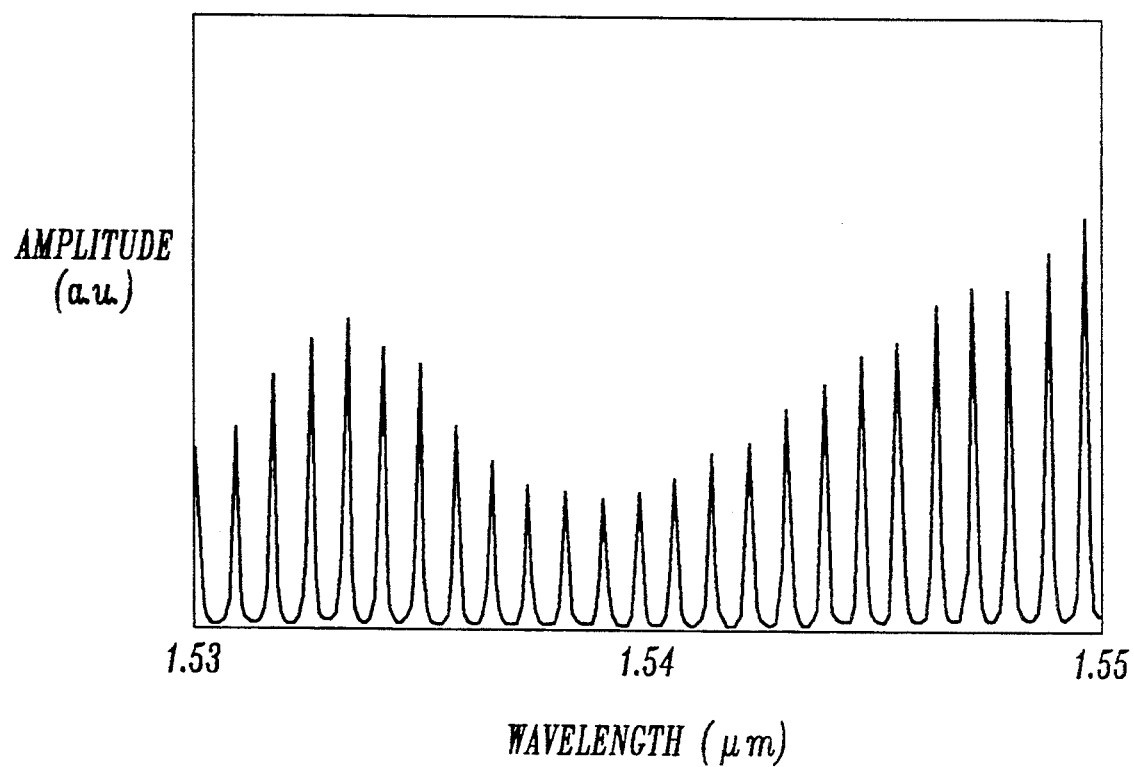
FIG. 3 shows an example of superimposed optical spectra produced by two etalons synchronized in accordance with the method of this invention.

FIG. 3 shows an example of the optical spectra produced by two etalons synchronized by the method of this invention. The resonant frequencies of these two etalons, which have been superimposed, appear to be identical. To confirm that the resonant frequencies of these etalons were indeed identical, a measurement was made of the beat spectrum of the lasers locked to the (m−10)th mode of two independent etalons at 0 Hz. Thus, these etalons provide an equally spaced comb of absolute references at 195.579±n×0.1034 THz, where n is any integer.

Figure 4:
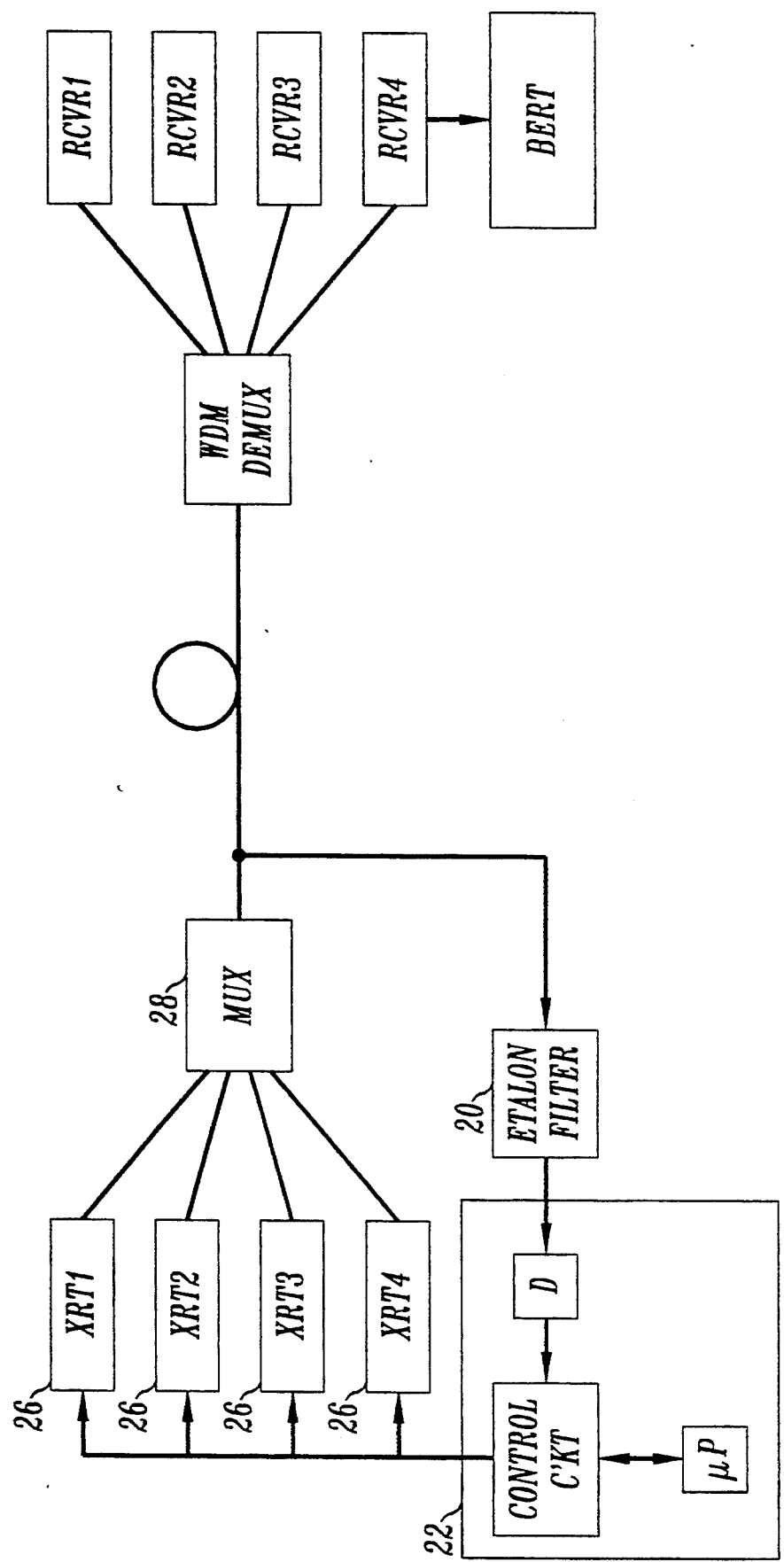
FIG. 4 shows a block diagram of an example of a WDM communications system that employs a standardized set of optical transmitter frequencies.

FIG. 4 shows a simplified block diagram of an example of a WDM communications system incorporating an etalon synchronized to a set of preselected optical frequencies. The system includes a series of optical transmitters 26 which each operate at a frequency equal to one of the preselected optical frequencies of the etalon. The communications system also includes a control circuit 22 for maintaining the optical frequencies of the optical transmitters at the preselected optical frequencies of the Fabry-Perot etalon and a multiplexer 20 for multiplexing the optical frequencies generated by the transmitters 26.

I claim:

1. A method of synchronizing a Fabry-Perot etalon to a preselected set of optical frequencies, said method comprising the steps of:

generating a first optical reference frequency with a first optical frequency reference and generating a second optical reference frequency distinct from said first optical reference frequency with a second optical frequency reference;

generating a transmission spectrum for an etalon having an effective length and a characteristic free spectral range that is a function of the effective length; and varying the effective length of the etalon to vary the characteristic free spectral range until the etalon generates a particular mode substantially equal to the first optical reference frequency and another mode having a minimum offset from the second optical reference frequency, said particular and another modes generated by the etalon being a preselected number of modes apart.

2. The method of claim 1 wherein the etalon has an angular position with respect to an incident optical frequency and wherein the step of varying the effective length comprises the step of varying the angular position of the etalon with respect to the incident optical frequency.

3. The method of claim 2 wherein the step of varying the angular position of the etalon comprises:

monitoring the transmission spectrum and fixing the angular position of the etalon when the amplitudes of the first and second optical reference frequencies are a maxima.

4. The method of claim 1 wherein said first and second optical frequency references are respectively provided by first and second frequency locked lasers.

5. The method of claim 4 wherein said first and second frequency locked lasers are locked to a first atomic transition in krypton occurring between $1s_2$ and $2p_8$ and a second atomic transition in krypton occurring between $2p_{10}$ and $3d_3$, respectively 6. The method of claim 4 further comprising the steps of:

providing a third frequency-locked laser locked to the one mode of the etalon;

generating a beat spectrum between the third frequency locked laser and the first frequency locked laser; and further varying the angular position of the etalon until the beat frequency of the beat spectrum is substantially equal to zero.

7. The method of claim 1 wherein the transmission spectrum is generated by a broadband optical source.

8. A WDM optical communication system comprising:

a Fabry-Perot etalon synchronized to a set of preselected optical frequencies by;

providing a first optical frequency reference generating a first optical reference frequency and a second optical frequency reference generating a second optical reference frequency distinct from said first optical reference frequency; generating a transmission spectrum for an etalon having an effective length and a characteristic free spectral range that is a function of the effective length; and varying the effective length of the etalon to vary the characteristic free spectral range until the etalon generates a particular mode substantially equal to the first optical reference frequency and another mode having a minimum offset from the second optical reference frequency, said particular and another modes generated by the etalon being a preselected number of modes apart;

means for generating the preselected optical frequencies;

at least two optical transmitters each operating at a frequency equal to one of the preselected optical frequencies;

a multiplexer for multiplexing the frequencies generated by the at least two optical transmitters;

an optical transmission path for transmitting the multiplexed frequencies;

a demultiplexer for demultiplexing the multiplexed frequencies;

at least two receivers for receiving selected ones of the demultiplexed frequencies; and means for maintaining the optical frequencies of the optical transmitters at the preselected optical frequencies of the Fabry-Perot etalon.

9. The etalon of claim 8 wherein the etalon has an angular position with respect to an incident optical frequency and wherein the step of varying the effective length comprises the step of varying the angular position of the etalon with respect to the incident optical frequency.

10. The etalon of claim 9 wherein the step of varying the angular position of the etalon comprises:

monitoring the transmission spectrum and fixing the angular position of the etalon when the amplitudes of the first and second optical reference frequencies are a maxima.

11. The etalon of claim 9 wherein said first and second optical frequency references are respectively provided by first and second frequency locked lasers.

12. The etalon of claim 11 wherein said first and second frequency locked lasers are locked to a first atomic transition in krypton occurring between $1s_2$ and $2p_8$ and a second atomic transition in krypton occurring between $2p_{10}$ and $3d_3$, respectively.

13. The etalon of claim 12 wherein the transmission spectrum is generated by a broadband optical source.

14. The etalon of claim 11 further comprising the steps of:

providing a third frequency-locked laser locked to the one mode of the etalon;

generating a beat spectrum between the third frequency locked laser and the first frequency locked laser; and further varying the angular position of the etalon until the beat frequency of the beat spectrum is substantially equal to zero.

15. A method of synchronizing a Fabry-Perot etalon to a preselected set of optical frequencies, said method comprising the steps of:

generating a first optical reference frequency with a first optical frequency reference and generating a second optical reference frequency distinct from said first optical reference frequency with a second optical frequency reference;

generating a transmission spectrum for an etalon having an effective length and a characteristic free spectral range that is a function of the effective length; and varying the effective length of the etalon to vary the characteristic free spectral range until the etalon generates a particular mode matching the first reference frequency and another mode matching the second optical reference frequency.

16. The method of claim 15 further comprising the step of preselecting the number of modes between said particular mode and said another mode of the etalon.

17. An etalon synchronized to a set of preselected optical frequencies by a method comprising: the steps of:

providing a first optical frequency reference generating a first optical reference frequency and a second optical frequency reference generating a second optical reference frequency distinct from said first optical reference frequency;

generating a transmission spectrum for an etalon having an effective length and a characteristic free spectral range that is a function of the effective length; and varying the effective length of the etalon to vary the characteristic free spectral range until the etalon generates a particular mode substantially equal to the first optical reference frequency and another mode having a minimum offset from the second optical reference frequency, said particular and another modes generated by the etalon being a preselected number of modes apart.

18. The etalon of claim 17 wherein the etalon has an angular position with respect to an incident optical frequency and wherein the step of varying the effective length comprises the step of varying the angular position of the etalon with respect to the incident optical frequency.

19. The etalon of claim 18 wherein the step of varying the angular position of the etalon comprises:

monitoring the transmission spectrum and fixing the angular position of the etalon when the amplitudes of the first and second optical reference frequencies are a maxima.

20. The etalon of claim 17 wherein said first and second optical frequency references are respectively provided by first and second frequency locked lasers.

21. The etalon of claim 20 wherein said first and second frequency locked lasers are locked to a first atomic transition in krypton occurring between $1s_2$ and $2p_8$ and a second atomic transition in krypton occurring between $2p_{10}$ and $3d_3$, respectively.

22. The etalon of claim 21 wherein the transmission spectrum is generated by a broadband optical source.

23. The etalon of claim 20 further comprising the steps of:

providing a third frequency-locked laser locked to the one mode of the etalon;

generating a beat spectrum between the third frequency locked laser and the first frequency locked laser; and further varying the angular position of the etalon until the beat frequency of the beat spectrum is substantially equal to zero.

* * * * *